United States Patent
Huang et al.

(10) Patent No.: US 9,191,770 B2
(45) Date of Patent: Nov. 17, 2015

(54) WIRELESS COMMUNICATION DEVICE AND HYBRID AUTOMATIC REPEAT REQUEST TRANSMISSION METHOD

(75) Inventors: Lei Huang, Singapore (SG); Isamu Yoshii, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 52 days.

(21) Appl. No.: 13/821,411

(22) PCT Filed: Sep. 9, 2011

(86) PCT No.: PCT/JP2011/005082
§ 371 (c)(1),
(2), (4) Date: Mar. 7, 2013

(87) PCT Pub. No.: WO2012/035732
PCT Pub. Date: Mar. 22, 2012

(65) Prior Publication Data
US 2013/0163522 A1    Jun. 27, 2013

(30) Foreign Application Priority Data
Sep. 15, 2010 (JP) .................................. 2010-206768

(51) Int. Cl.
| | |
|---|---|
| H04W 4/00 | (2009.01) |
| H04L 1/00 | (2006.01) |
| H04L 1/18 | (2006.01) |
| H04W 28/14 | (2009.01) |
| H04L 1/06 | (2006.01) |

(52) U.S. Cl.
CPC .............. *H04W 4/00* (2013.01); *H04L 1/0076* (2013.01); *H04L 1/1812* (2013.01); *H04L 1/1874* (2013.01); *H04L 1/0618* (2013.01); *H04L 2001/0097* (2013.01); *H04W 28/14* (2013.01)

(58) Field of Classification Search
CPC ...... H04W 24/02; H04W 24/10; H04W 76/02
USPC .................................................. 370/412, 328
See application file for complete search history.

(56) References Cited

U.S. PATENT DOCUMENTS

2008/0192722 A1* 8/2008 Jung et al. ...................... 370/345
2010/0014527 A1* 1/2010 Sakauchi ................ H04L 12/42
                                                  370/400

(Continued)

OTHER PUBLICATIONS

Johnsson et al (Client Cooperation in Future Wireless Broadband Networks, Document No. IEEE C802.16-10/0005r1.Date Submitted: Jan. 12, 2010).*

(Continued)

*Primary Examiner* — Wei Zhao
*Assistant Examiner* — Abdeltif Ajid
(74) *Attorney, Agent, or Firm* — Pearne & Gordon LLP

(57) ABSTRACT

By reducing the overlap between HARQ subpackets transmitted by means of a transmitting MS and a cooperative MS, the disclosed method is capable of increasing gains in HARQ IR signal synthesis. The method transmits a hybrid automatic repeat request (HARQ) in a cooperative communication system formed so as to comprise a transmitting mobile station (MS) and a cooperative MS, and involves creating individual HARQ subpackets transmitted by means of the transmitting MS and the cooperative MS such that said subpackets are arranged in mutually opposite directions in a circular buffer.

4 Claims, 12 Drawing Sheets

(56) References Cited

U.S. PATENT DOCUMENTS

2010/0195662 A1* 8/2010 Kang .................... H04L 1/0043
  370/412
2012/0110406 A1* 5/2012 Sun et al. ...................... 714/751

OTHER PUBLICATIONS

Client Cooperation in Future Wireless Broadband Networks, Document No. IEEE C802.16-10/0005r1. Date Submitted: Jan. 12, 2010 by johnson.*

IEEE P802.16m/D6, Draft Amendment to IEEE Standard for local and metropolitan area networks—Part 16: Air Interface for Broadband Wireless Access Systems—Advanced Air Interface, May, 2010.
IEEE C802.16-10/0016r1, Future 802.16 Networks: Challenges and Possibilities, Mar. 19, 2010.
Kerstin Johnsson, et al., IEEE C802.16-10/0005r1, Client Cooperation in Future Wireless Broadband Networks, Jan. 12, 2010.
International Search Report for PCT/JP2011/005082 dated Nov. 22, 2011.

* cited by examiner

WIRELESS COMMUNICATION DEVICE AND HYBRID AUTOMATIC REPEAT REQUEST TRANSMISSION METHOD

TECHNICAL FIELD

The present invention relates to the field of a hybrid automatic repeat request when performing a client collaboration.

BACKGROUND ART

The IEEE (Institute of Electrical and Electronics Engineers) 802.16 working group is creating an 802.16m radio interface specification that satisfies requirements of an IMT (International Mobile Telecommunications)-advanced next-generation mobile phone system. Based on the IEEE 802.16m draft standard, the WiMAX (Worldwide Interoperability for Microwave Access) forum is working out the WiMAX release 2.0 MSP (Mobile System Profile; mobile communication system profile) (see NPL 1). The IEEE 802.16m standard and WiMAX release 2.0 MSP are expected to be completed by early 2011.

The IEEE802.16 working group has also started envisioning and designing a future 802.16/WiMAX network which excels 802.16m/WiMAX2.0. There is common recognition among the 802.16/WiMAX community that the future 802.16/WiMAX will support an explosive increase of mobile communication data traffic spurred by apparatuses with greater screens, multimedia applications and an increasing number of connected users and apparatuses. The future 802.16/WiMAX network will also efficiently cooperate with other wireless techniques such as 802.11/Wi-Fi (Wireless Fidelity).

The future 802.16/WiMAX network will be drastically improved regarding various performance index values such as throughput and SE (Spectral Efficiency) compared to the 802.16m network. For example, when coverage in a metropolitan area is assumed, the future 802.16/WiMAX network is aiming at SE at a cell edge twice that of the 802.16m/WiMAX2.0 network on both UL (uplink) and DL (downlink) (see NPL 2). It should be noted that the 802.16m/WiMAX2.0 network has SE at a cell edge of at least 0.06 bps/Hz/sec of DL in a 4×2 antenna configuration and SE at a cell edge of at least 0.03 bps/Hz/see of UL in a 2×4 antenna configuration.

For example, collaboration techniques such as CliCo (Client Collaboration) has assured a drastic improvement in SE at a cell edge and energy efficiency of an entire network of a radio communication system. CliCo is a technique for clients to jointly transmit/receive data in radio communication (see NPL 3). CliCo uses client clustering and peer-to-peer communication to transmit/receive information through a plurality of paths between a BS and a client. As a result, it is possible to improve SE at a cell edge without any increase in infrastructure costs. Furthermore, CliCo can extend the service life of a battery of a client having a poor channel.

FIG. 1 shows a diagram illustrating typical radio communication system 100 that performs CliCo. Radio communication system 100 includes BS (base station) 102 and a plurality of MSs (mobile stations), for example MS 104 and MS 106.

FIG. 2 is a block diagram illustrating typical BS 102. BS 102 is equipped with only WiMAX and is constructed of WiMAX PHY block 130 and WiMAX MAC block 120. WiMAX MAC block 120 performs a WiMAX OFDMA (Orthogonal Frequency Division Multiple Access)-based media access control protocol. WiMAX PHY block 130 performs the WiMAX OFDMA-based physical layer protocol under the control of WiMAX MAC block 120.

Referring to FIG. 2, WiMAX MAC block 120 is further constructed of control section 122, scheduler 124, message creation section 126 and message processing section 128.

Control section 122 controls a general MAC protocol operation. Scheduler 124 schedules allocation of resources to each MS under the control of control section 122. Upon receiving resource allocation scheduling information from scheduler 124, message creation section 126 creates a data packet and DL control signaling. Message processing section 128 analyzes the data packet and UL control signaling received from the plurality of MSs under the control of control section 122 and reports the analysis result to control section 122.

It should be noted that the data packet and DL control signaling created by message creation section 126 are transmitted to the plurality of MSs by BS 102 via OFDMA transmitter 136 in WiMAX PHY block 130. The data packet and UL control signaling analyzed by message processing section 128 is received by BS 102 via OFDMA receiver 138 in WiMAX PHY block 130.

Referring to FIG. 2, message creation section 126 includes HFBCH (HARQ Feedback Channel) creation section 132 and resource allocation creation section 134. Here, HARQ represents a hybrid automatic repeat request. HFBCH creation section 132 creates a HARQ feedback channel for UL data transmission that carries HARQ feedback information (e.g., ACK/NACK) for UL data transmission. Resource allocation creation section 134 creates resource allocation control signalling for UL/DL data transmission that carries resource allocation information for each of the plurality of MSs.

Referring to FIG. 2, channel coder 502 exists in OFDMA transmitter 136. Channel coder 502 converts a data burst obtained from message creation section 126 to a baseband modulated signal. FIG. 3 shows a block diagram illustrating typical channel coder 502. Channel coder 502 is constructed of FEC encoder 304, circular buffer 308, HARQ subpacket generator (bit selection and repetition block) 306, modulator 310 and subpacket generation control section 312.

Referring to FIG. 3, FEC encoder 304 converts a data burst to coded bits using a predetermined coding scheme such as CTC (Convolutional Turbo Coding). The coded bits made up of information bits and parity bits are normally stored in circular buffer 308. The information bits are arranged from the leading part of circular buffer 308, followed by the parity bits. The size of circular buffer 308 for the data burst can be expressed as follows, (Equation 1)

$$N_{CB} = \frac{N_{DB}}{M_{cr}} \quad [1]$$

Here, $N_{DB}$ is a size of the data burst, $M_{cr}$ is a mother coding rate of FEC encoder 304 such as $M_{cr}=\frac{1}{3}$.

Referring to FIG. 3, HARQ subpacket generator 306 punctures (or repeats) the coded bits in circular buffer 308 to thereby create a HARQ subpacket.

FIG. 4 illustrates a HARQ subpacket generation method at $M_{cr}=\frac{1}{3}$.

To create a HARQ subpacket to be transmitted at i-th transmission, HARQ subpacket generator 306 needs to know the starting position (that is, $P_i$) in circular buffer 308 and the size (that is, $N_i$) of the HARQ subpacket transmitted at the i-th transmission. The starting position and size are supplied by subpacket generation control section 312.

The starting position of the HARQ subpacket transmitted at the i-th transmission is normally determined by an SPID (subpacket identifier) of a HARQ transmitted at the i-th transmission. Subpacket generation control section 312 determines the size of the HARQ subpacket according to MCS information and resource allocation information and indicates the size to HARQ subpacket generator 306. The MCS information and the resource allocation information are described in the resource allocation control signalling created by resource allocation creation section 134.

Referring to FIG. 3, modulator 310 converts the HARQ subpacket to a baseband modulated signal.

Referring to FIG. 2, channel decoder 504 exists in OFDMA receiver 138. Channel decoder 504 demodulates/decodes a baseband modulated signal received using HARQ soft combining such as HARQ IR (Incremental Redundancy).

FIG. 5 shows a block diagram illustrating typical MS 104. MS 104 is provided with WiMAX and Wi-Fi, and is constructed of WiMAX PHY block 142, Wi-Fi PHY block 144, WiMAX MAC block 146, Wi-Fi MAC block 148 and GLL (general link layer) block 150. WiMAX MAC block 146 executes a WiMAX OFDMA-based media access control protocol. WiMAX PHY block 142 executes a WiMAX OFDMA-based physical layer protocol under the control of WiMAX MAC block 146. Wi-Fi MAC block 148 executes a Wi-Fi CSMA/CA (Carrier Sense Multiple Access with Collision Avoidance)-based media access control protocol. Wi-Fi PHY block 144 executes a Wi-Fi OFDM (Orthogonal Frequency Division Multiplexing)/DSSS (Direct Sequence Spread Spectrum)-based physical layer protocol, under the control of Wi-Fi MAC block 148. GLL block 150 has a function of managing coordinated operation between heterogeneous WiMAX and Wi-Fi links.

Referring to FIG. 5, WiMAX MAC block 146 is further constructed of control section 154, message creation section 152 and message processing section 156. Control section 154 controls a general MAC protocol operation. Message creation section 152 creates UL control signaling and a data packet under the control of control section 154. Message processing section 156 analyzes a data packet and DL control signaling received from BS 102 under the control of control section 154 and reports the analysis result to control section 154.

It should be noted that the data packet and UL control signalling created by message creation section 152 is transmitted to BS 102 by MS 104 via OFDMA transmitter 162 in WiMAX PHY block 142. The data packet and DL control signaling to be analyzed by message processing section 156 is received by MS 104 via OFDMA receiver 164 in WiMAX PHY block 142.

Referring to FIG. 5, resource analysis section 151 and HFBCH analysis section 153 exist in message processing section 156. HFBCH analysis section 153 analyzes a received HFBCH in response to UL data transmission and decides whether the corresponding UL data transmission has been successful or not. Resource analysis section 151 analyzes the received resource allocation control signalling and extracts resource allocation information identified for MS 104. In the case of UL data transmission, a data packet created by message creation section 152 under the control of control section 154 is then transmitted by MS 104 to BS 102 according to the extracted resource allocation information.

Referring to FIG. 5, channel coder 402 exists in OFDMA transmitter 162 and channel decoder 404 exists in OFDMA receiver 164. It should be noted that channel coder 402 in OFDMA transmitter 162 has a configuration and function similar to those of channel coder 502 in OFDMA transmitter 136, and channel decoder 404 in OFDMA receiver 164 has a configuration and function similar to those of channel decoder 504 in OFDMA receiver 138.

FIG. 6 shows a block diagram illustrating typical MS 106. MS 106 is also provided with both WiMAX and Wi-Fi, and has a configuration and function quite similar to those of MS 104. Channel coder 602 in OFDMA transmitter 182 has a configuration and function similar to those of channel coder 402 in OFDMA transmitter 162. As shown in FIG. 5, a main difference between MS 104 and MS 106 is that scheduler 158 exists in the Wi-Fi MAC block of MS 104 and this scheduler is used for collaboration scheduling for CliCo.

Referring to FIG. 1, BS 102 communicates with MS 104 via WiMAX links 108*a* and 108*b*, and communicates with MS 106 via WiMAX links 110*a* and 110*b*. MS 104 communicates with MS 106 peer-to-peer Wi-Fi links 112*a* and 112*b*. Alternatively, MS 104 may also communicate with MS 104 using other wireless techniques such as WiMAX, Bluetooth or 60 GHz mmW (millimeter wave).

It should be noted that CliCo can be realized on both DL and UL of radio communication system 100. In the present invention, the operation of CliCo on an UL (uplink) in radio communication system 100 is taken as an example.

Referring to FIG. 1, when signal quality of WiMAX link 108*a* between BS 102 and MS 104 degrades, MS 104 can start an UL (uplink) CliCo procedure such as neighbor discovery, cooperator selection/allocation. When signal quality of WiMAX link 110*a* between BS 102 and MS 106 is good, MS 104 can select MS 106 as a cooperator. In the context of CliCo, MS 104 is called originating MS and MS 106 is called cooperating MS.

CliCo may occur in various situations. For example, if originating MS 104 is assumed to be located at the back of a cafeteria, signal quality of the WiMAX link to originating MS 104 may be quite low. On the other hand, if cooperating MS 106 is assumed to be located much closer to the window or entrance of the cafeteria than originating MS 104, cooperating MS 106 can thereby have much higher signal quality of WiMAX link than originating MS 104.

FIG. 7 shows a diagram illustrating typical frame configuration 200 applicable to a radio communication system that performs the CliCo shown in FIG. 1. Referring to FIG. 7, each of frame 202 and frame 212 is made up of eight subframes. Five of the eight subframes are DL subframes and the rest are UL subframes.

As far as CliCo of the UL (uplink) is concerned, BS 102 can transmit MAP 220 to a plurality of mobile stations connected to BS 102 including originating MS 104 and cooperating MS 106 involved in CliCo in first DL subframe 204 of frame 202. MAP 220 is made up of a plurality of MAP IEs (information elements). Some of the MAP IEs can carry HARQ feedback information for UL data transmission and some other MAP IEs can carry resource allocation information for DL/UL data transmission. One MAP IE in MAP 220 that carries HARQ feedback information forms an HBFCH for UL data transmission.

During period 208 between first DL subframe 204 and first UL subframe 206 of frame 202, originating MS 104 and cooperating MS 106 need to decode MAP 220 to obtain resource allocation information including their respective items of HFBCH index information. Furthermore, originating MS 104 needs to transmit UL data burst 250 to cooperating MS 106 via peer-to-peer Wi-Fi link 112*a*.

If originating MS 104 has successfully decoded MAP 220 transmitted by BS 102 via WiMAX link 108*b*, originating MS 104 transmits a HARQ subpacket of UL data burst 250 to BS 102 via WiMAX link 108*a* according to the received resource allocation information in first UL subframe 206 of frame 202.

On the other band, if cooperating MS 106 has successfully decoded MAP 220 transmitted by BS 102 via WiMAX link 110b and has also successfully received UL data burst 250 transmitted from originating MS 104 via peer-to-peer Wi-Fi link 112a, cooperating MS 106 simultaneously transmits the HARQ subpacket of same UL data burst 250 to BS 102 via WiMAX link 110a according to the received resource allocation information in first UL subframe 206 of frame 202. As a result, BS 102 can perform HARQ soft combining of combining two HARQ subpackets of UL data burst 250 received from WiMAX link 108a and WiMAX link 110a to improve quality of the received signal.

In second DL subframe 214 of frame 212, BS 102 can transmit MAP 240 to a plurality of mobile stations connected to BS 102 including originating MS 104 and cooperating MS 106 involved in CliCo. As described above, HFBCHs which form a part of MAP 240 can carry HARQ feedback information for UL data burst 250 transmitted by originating MS 104 and cooperating MS 106 in first UL subframe 206 of frame 202.

During period 218 between second DL subframe 214 and first UL subframe 216 of frame 212, in order to obtain the respective items of HARQ feedback information for UL data burst 250, originating MS 104 and cooperating MS 106 need to decode their respective HFBCHs in MAP 240 according to HFBCH index information obtained by decoding MAP 220 during period 208.

When the HARQ feedback information indicates in first UL subframe 206 of frame 202 that BS 102 has not correctly decoded UL data burst 250 transmitted by originating MS 104 and cooperating MS 106, originating MS 104 and cooperating MS 106 need to retransmit UL data burst 250 in first UL subframe 216 of frame 212.

According to the IEEE 802.16m draft standard, the specified HARQ transmission mechanism does not deal with UL (uplink) CliCo (see NPL 1). However, the same mechanism is applicable to UL (uplink) CliCo in a direct way.

According to the IEEE 802.16m draft standard, on an UL, a "synchronous HARQ operating mode" in which HARQ timing is performed at a constant interval is used and a "non-adaptive HARQ operating mode" in which the resource size or the like is not changed is used (see NPL 1).

In the synchronous HARQ operating mode, both originating MS 104 and cooperating MS 106 can use the same HARQ subpacket transmission rule as shown in Table 1.

TABLE 1

|  | SPID | | | | |
| --- | --- | --- | --- | --- | --- |
|  | Initial trans- mission | Second trans- mission | Third trans- mission | Fourth trans- mission | Fifth trans- mission |
| Originating MS | 0 | 1 | 2 | 3 | 0 ... |
| Cooperating MS | 0 | 1 | 2 | 3 | 0 ... |

According to the subpacket transmission rule shown in Table 1, each of originating MS 104 and cooperating MS 106 transmits a subpacket having SPID=0 at initial transmission and transmits one of subpackets having SPID=0, 1, 2, 3 in cyclic order of retransmission.

According to the IEEE 802.16m draft standard, the resource allocation information is transmitted by BS 102 only at the initial transmission using MAP IEs addressed to originating MS 104 and cooperating MS 106, and this information is also used for retransmission by originating MS 104 and cooperating MS 106 (see NPL 1). That is, this means that the size of the HARQ subpacket is the same for both originating MS 104 and cooperating MS 106 whether in HARQ transmission or in HARQ retransmission.

According to the IEEE 802.16m draft standard, for both originating MS 104 and cooperating MS 106, the starting position of the HARQ subpacket transmitted at i-th transmission is determined as follows (see NPL 1).

[2]

$$P_i[\text{SPID}(i) \cdot N] \bmod N_{CB} \quad \text{(Equation 2)}$$

Here, N is a size of a HARQ subpacket (N=$N_{OM}$ for originating MS 104, N=$N_{CM}$ for cooperating MS 106), N=$N_{RE}$·$N_{SM}$·$N_{mod}$, where $N_{RE}$ is the number of data tones (data units) allocated for transmission of a data burst and $N_{SM}$ is an STC (space-time coding) rate and $N_{mod}$ is a modulation order. The values of $N_{RE}$, $N_{SM}$ and $N_{mod}$ can be obtained from the resource allocation information. $N_{CB}$ is a circular buffer size for a data burst defined in equation 1. SPID(i) is an SPIN of a HARQ subpacket transmitted at i-th transmission.

FIG. 8 illustrates typical HARQ subpacket transmission performed by both originating MS 104 and cooperating MS 106 according to the subpacket transmission rule shown in Table 1 and the rule for determining the starting positions of HARQ subpackets defined in equation 2. In FIG. 8, suppose coding rate $M_{cr}$=⅓ and $N_{OM}$=$N_{CM}$=⅜·$N_{CB}$ of the FEC encoder.

Referring to FIG. 8, in originating MS 104, the starting positions of the HARQ subpackets in four transmissions including the initial transmission are calculated as follows.

$$P_1=0$$

$$P_2=⅜·N_{CB}$$

$$P_3=¾·N_{CB}(=6/8·N_{CB})$$

$$P_4=⅛·N_{CB}$$

In cooperating MS 106, the starting positions of the HARQ subpackets in four transmissions including the initial transmission are calculated as follows.

$$P_1=0$$

$$P_2=¼·N_{CB}$$

$$P_3=½·N_{CB}=2/4·N_{CB})$$

$$P_4=¾·N_{CB}$$

It is easily understandable from FIG. 8 that individual HARQ subpackets transmitted by originating MS 104 and cooperating MS 106 are created so as to be in the same direction in the circular buffer. Furthermore, the individual HARQ subpackets transmitted by originating MS 104 and cooperating MS 106 apparently overlap with each other even in initial transmission.

CITATION LIST

Non-Patent Literature

NPL 1
IEEE P802.16m/D6, DRAFT Amendment to IEEE Standard for local and metropolitan area networks—Part 16: Air Interface for Broadband Wireless Access Systems—Advanced Air Interface NPL 2
IEEE C802.16-10/0016r1, Future 802.16 Networks: Challenges and Possibilities

NPL 3

IEEE C802.16-10/0005r1, Client Collaboration in. Future Wireless Broadband Networks

SUMMARY OF INVENTION

Technical Problem

According to the IEEE 802.16m draft standard, as shown in FIG. 8, HARQ subpackets transmitted by originating MS 104 and cooperating MS 106 apparently overlap with each other even at initial transmission (see NPL 1). Thus, no signal combining gain by HARQ IR may be obtained even at initial transmission. Especially, when the propagation path characteristics in WiMAX link 108a and WiMAX link 110a in FIG. 1 are similar, it is difficult to obtain a combining gain.

Furthermore, as shown in FIG. 8, there may also be a case where the size of a HARQ subpacket transmitted by originating MS 104 is different from the size of a HARQ subpacket transmitted by cooperating MS 106, and in this case, at initial transmission in particular, a HARQ subpacket transmitted by cooperating MS 106 becomes part of a HARQ subpacket transmitted by originating MS 104 and it becomes noticeable that no signal combining gain by HARQ IR can be obtained.

Solution to Problem

According to an aspect of the present invention, a method for transmitting a hybrid automatic repeat request (HARQ) in a cooperative communication system including an originating mobile station (MS) and a cooperating MS, includes creating individual HARQ subpackets transmitted by the originating MS and the cooperating MS so as to be in mutually opposite directions in a circular buffer.

According to another aspect of the present invention, the above method further includes setting a starting position in the circular buffer of a first HARQ subpacket transmitted by the originating MS at a leading end of the circular buffer and setting a termination position in the circular buffer of the first HARQ subpacket transmitted by the cooperating MS at a rear end of the circular buffer.

According to a further aspect of the present invention, the above method further includes setting the starting position in the circular buffer of the first HARQ subpacket transmitted by the originating MS at a certain position within a range of information bits in the circular buffer and setting the termination position in the circular buffer of the first HARQ subpacket transmitted by the cooperating MS at a certain position in the range of information bits in the circular buffer.

According to a still further aspect of the present invention, an offset (difference) of the starting position in the circular buffer of the first HARQ subpacket transmitted by the originating MS, relative to the position of the last information bit in the circular buffer is either predetermined or settable.

According to a still further aspect of the present invention, an offset (difference) of the termination position in the circular buffer of the first HARQ subpacket transmitted by the cooperating MS, relative to the leading end of the circular buffer is either predetermined or settable.

According to a still further aspect of the present invention, a method for transmitting a hybrid automatic repeat request (HARQ) in a cooperative communication system including an originating mobile station (MS) and a cooperating MS, includes setting starting positions of individual HARQ subpackets transmitted by the originating MS according to the size of the HARQ subpackets transmitted by the cooperating MS and setting starting positions of the individual HARQ subpackets transmitted by the cooperating MS according to the size of the HARQ subpackets transmitted by the originating MS.

According to a still further aspect of the present invention, the above method further includes setting the starting position of an i-th HARQ subpacket of the cooperating MS at a termination position of the i-th HARQ subpacket of the originating MS and setting the starting position of an (i+1)-th HARQ subpacket of the originating MS at a termination position of the i-th HARQ subpacket of the cooperating MS.

The above and other features and advantages of the present invention will be better understood by referring to the detailed description of the invention which will be described below with the accompanying drawings and the accompanying scope of patent claims.

Advantageous Effects of Invention

The present invention allows a signal combining gain of HARQ IR to be improved by reducing overlapping between individual HARQ subpackets transmitted by originating MS 104 and cooperating MS 106.

DESCRIPTION OF EMBODIMENTS

Hereinafter, embodiments of the present invention will be described in detail with reference to the accompanying drawings. Detailed descriptions of known functions and configurations used for the specification of the present application are omitted for clarity and simplicity.

First Embodiment

Figure 1:
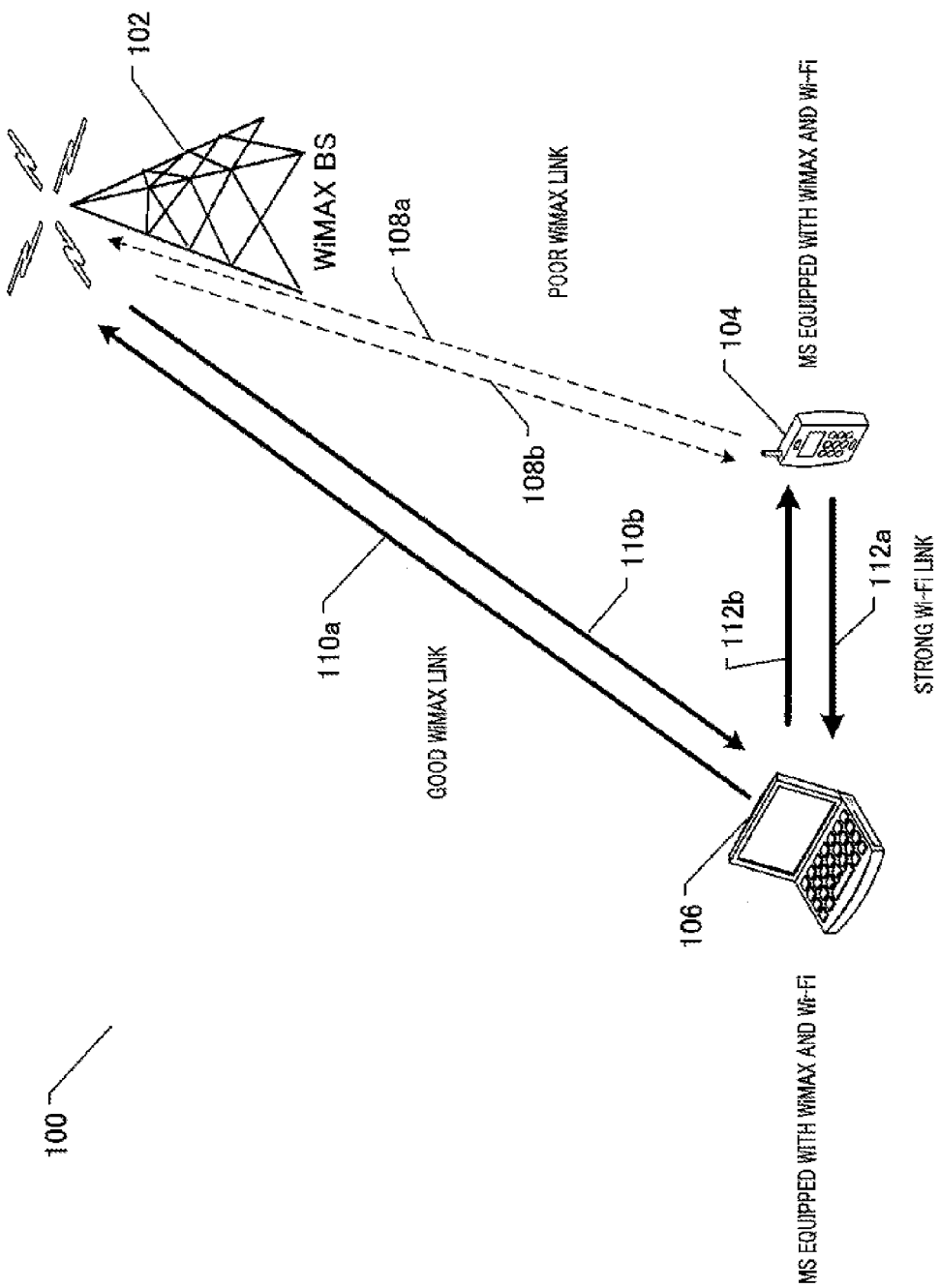
FIG. 1 is a diagram illustrating a typical radio communication system that performs CliCo (client collaboration)
Figure 2:
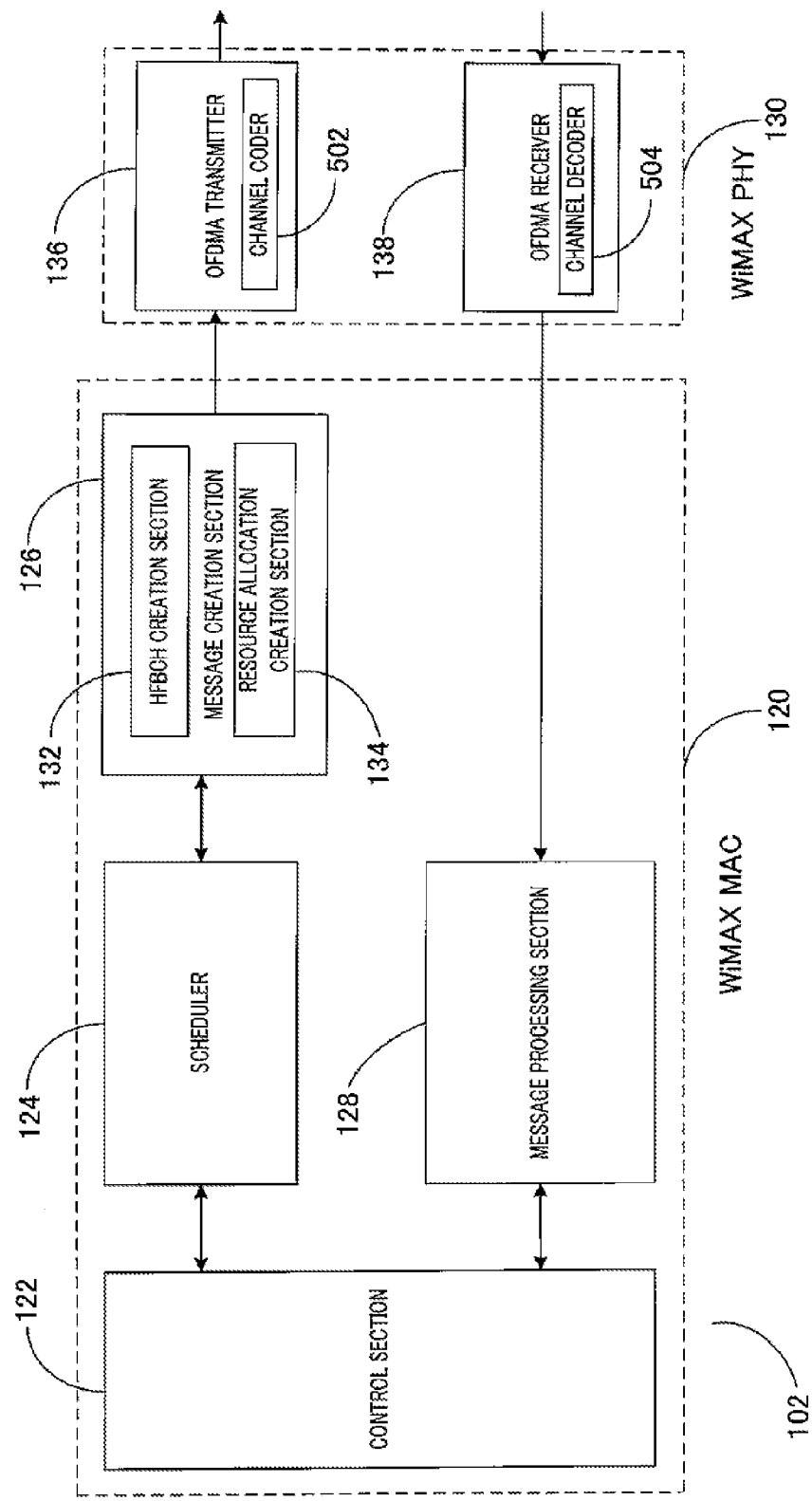
FIG. 2 is a block diagram illustrating a typical BS (base station)
Figure 3:
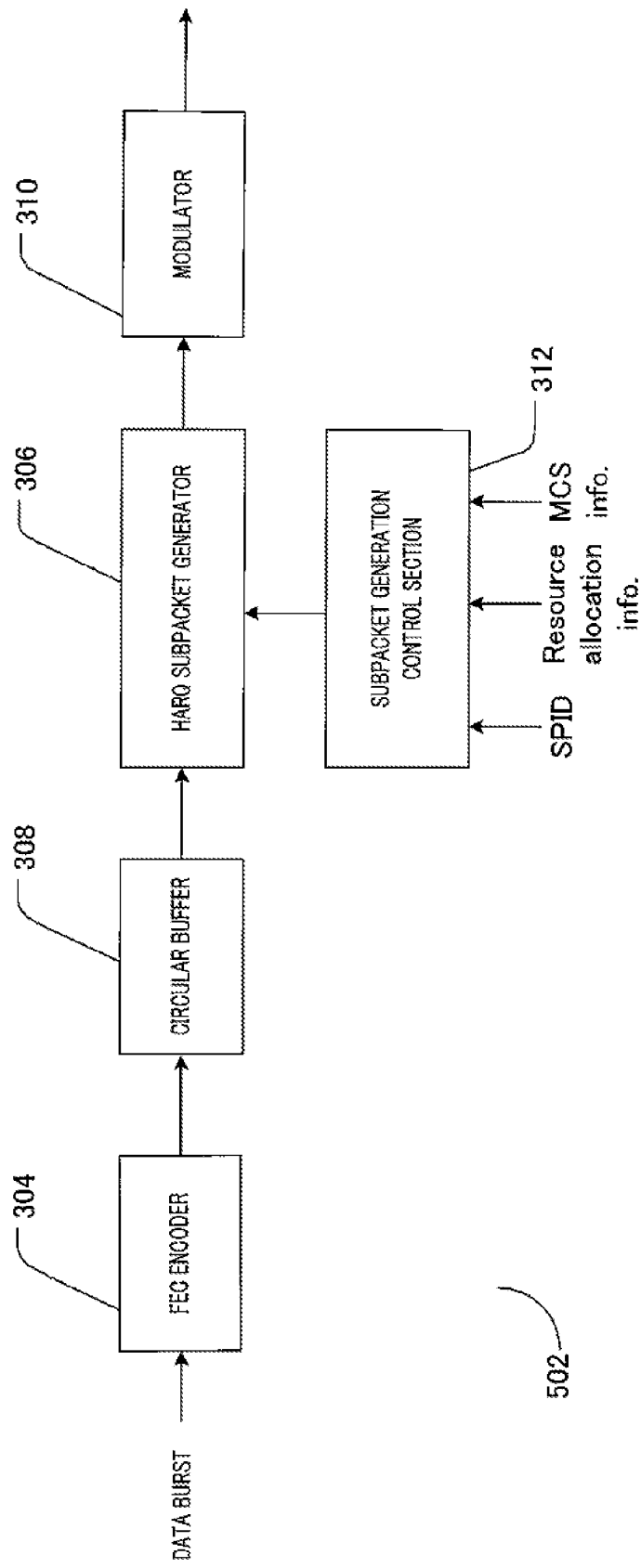
FIG. 3 is a block diagram illustrating a typical channel coder.
Figure 4:
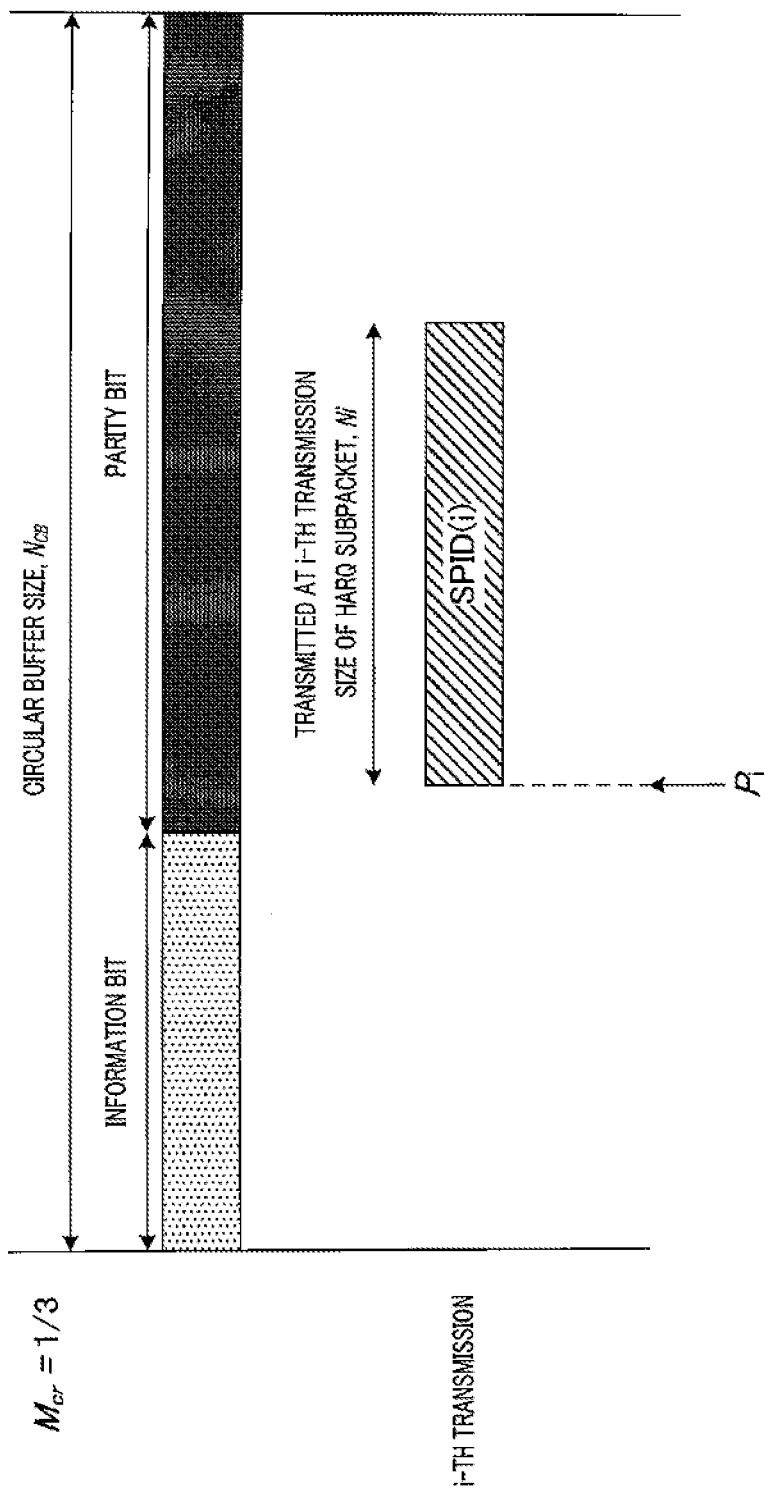
FIG. 4 is a diagram illustrating a method for generating a typical HARQ subpacket.
Figure 5:
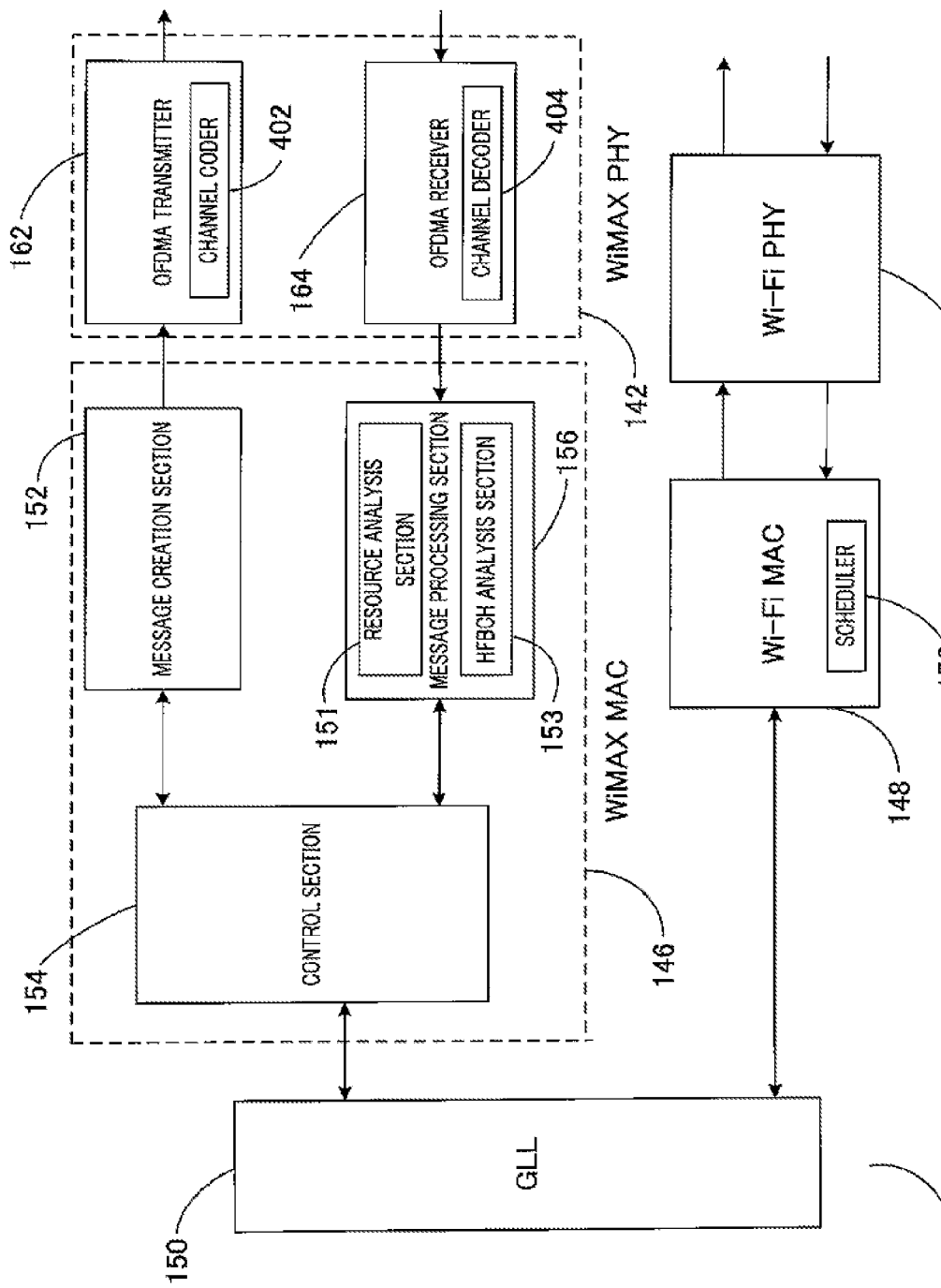
FIG. 5 is a block diagram illustrating a typical originating MS (mobile station)
Figure 6:
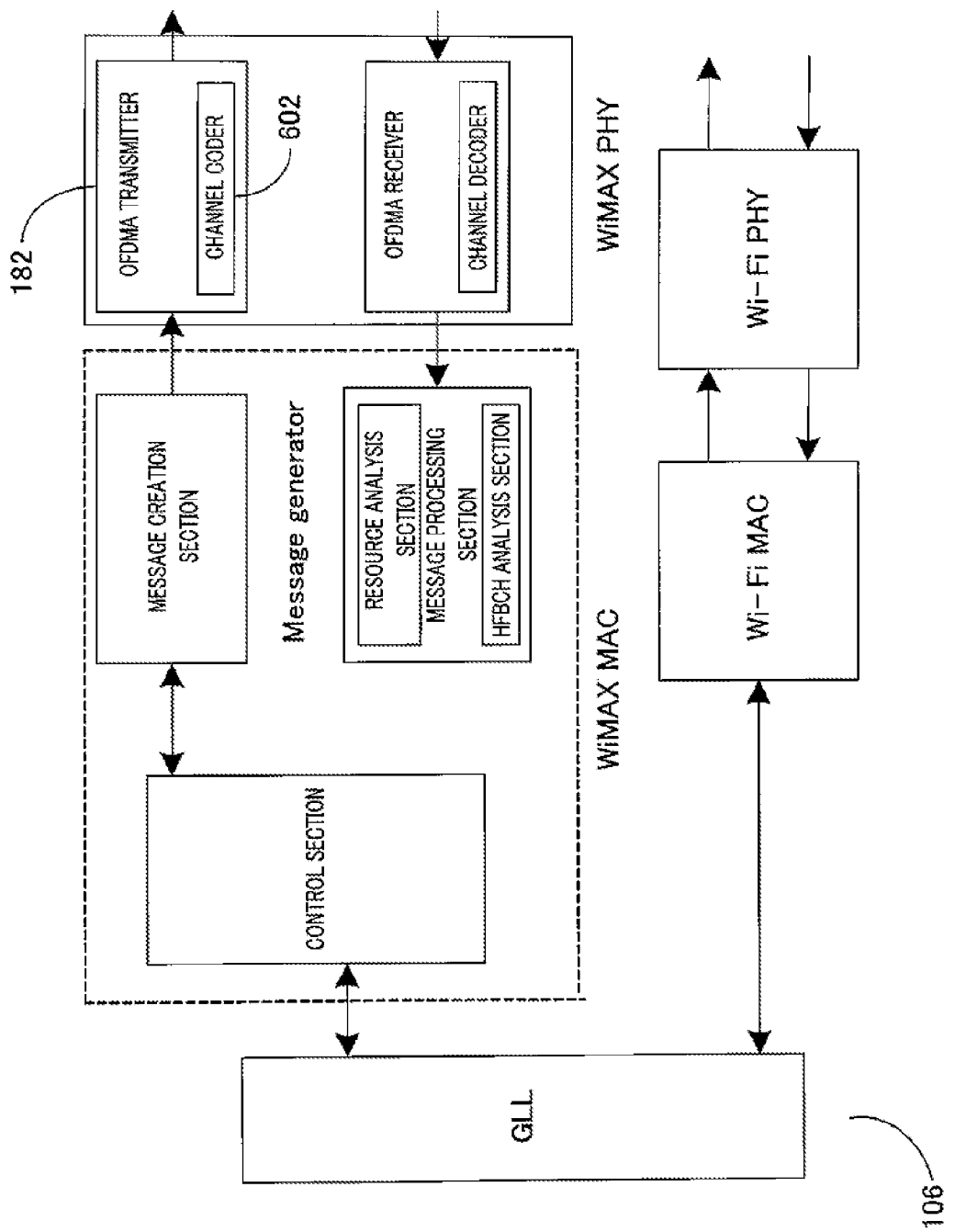
FIG. 6 is a block diagram illustrating a typical cooperating MS.
Figure 7:
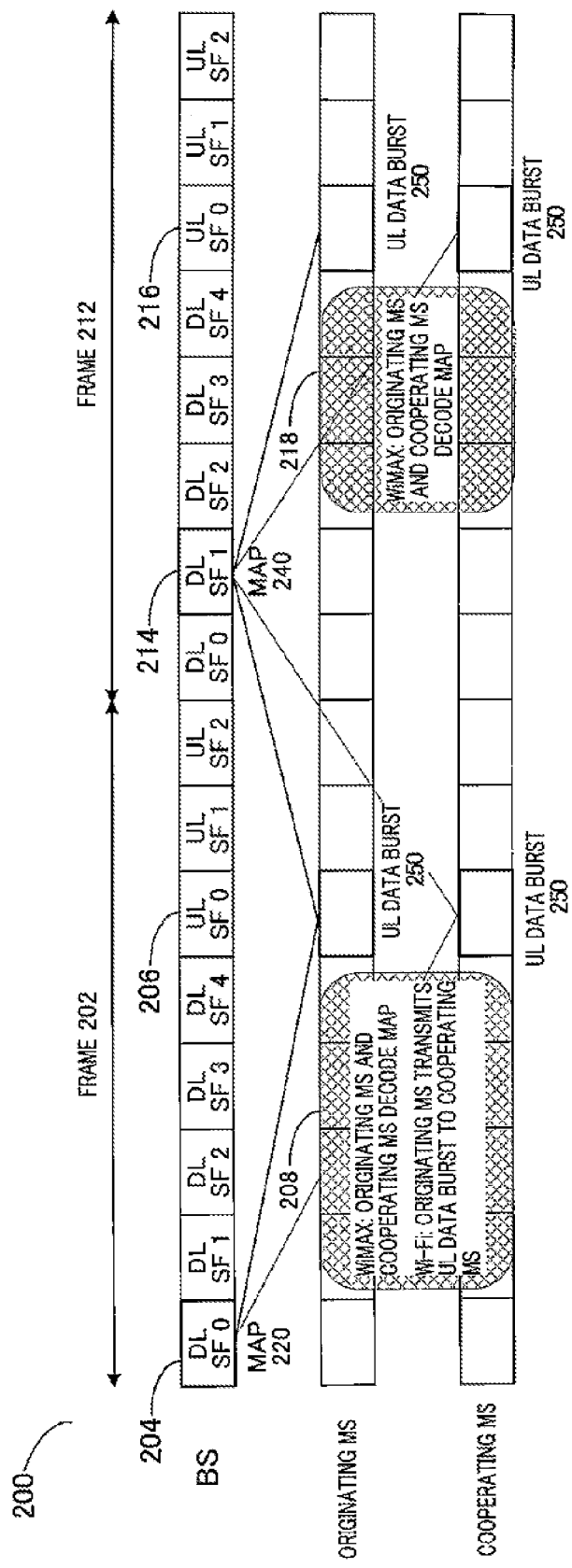
FIG. 7 is a diagram illustrating a typical frame configuration.
Figure 8:
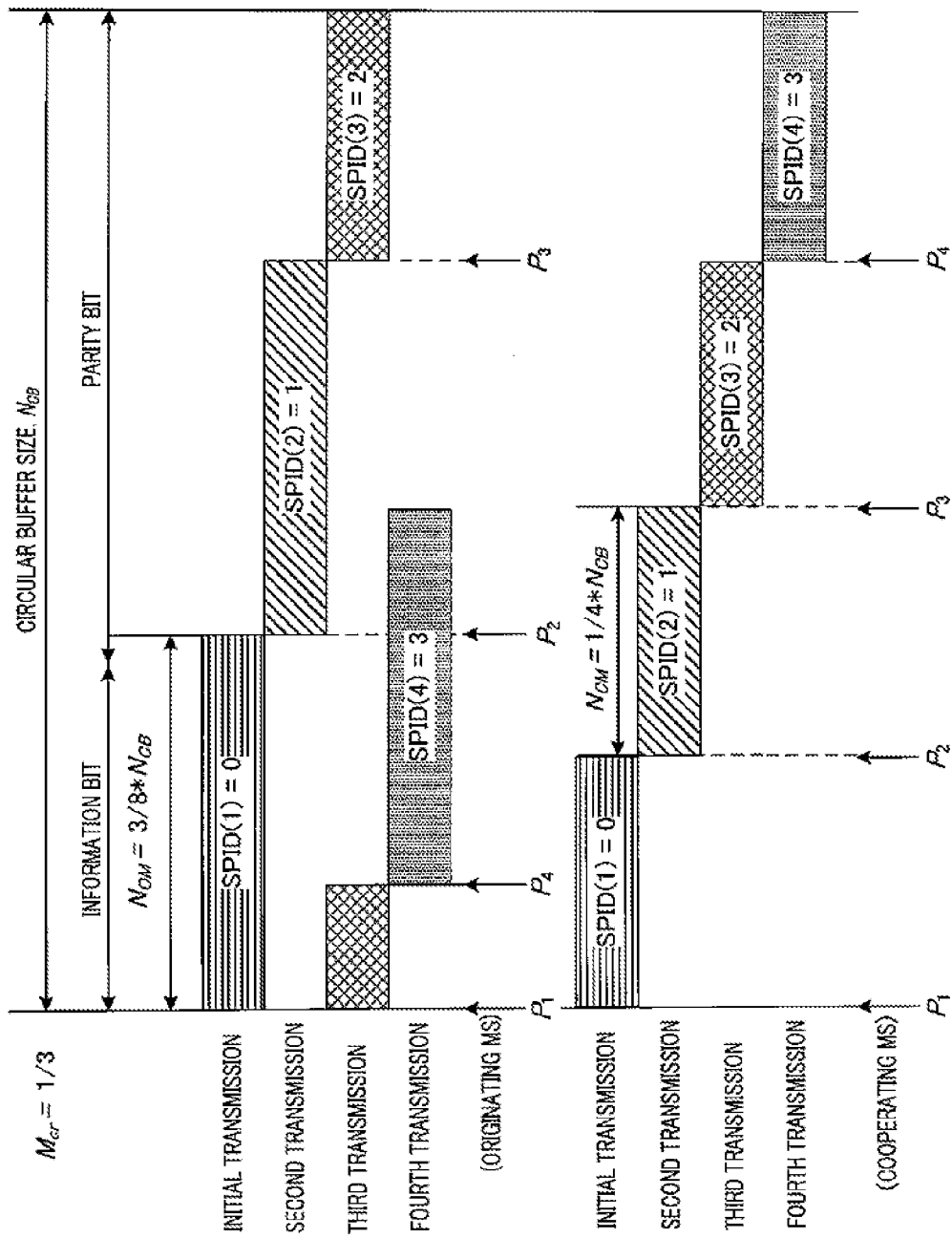
FIG. 8 is a diagram illustrating transmission of a typical HARQ subpacket transmitted four times including the initial transmission according to a conventional technique when the sizes of HARQ subpackets transmitted by an originating MS and a cooperating MS are different.
Figure 9:
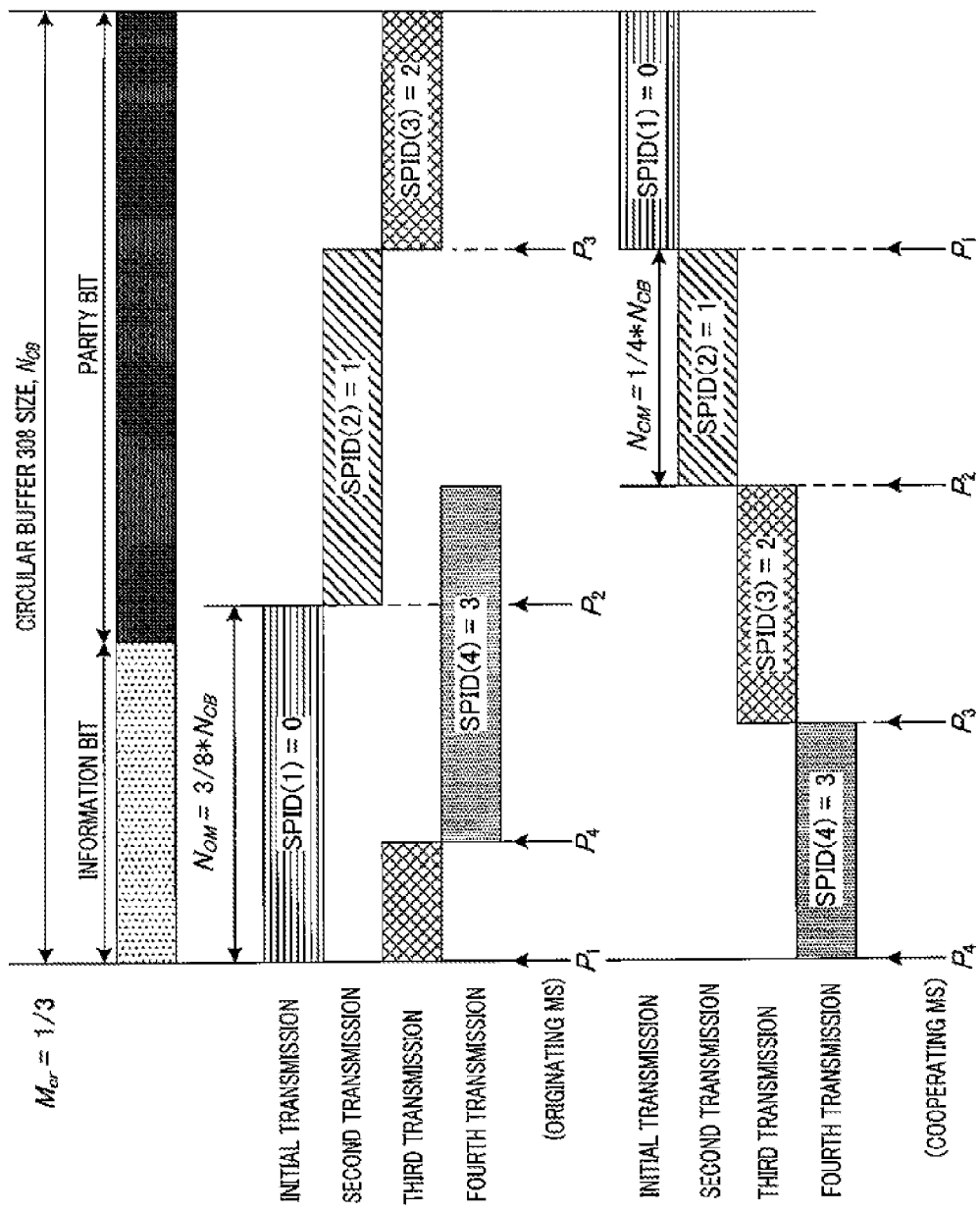
FIG. 9 is a diagram illustrating transmission of a typical HARQ subpacket transmitted four times including the initial transmission according to a first embodiment of the present invention.

In a method for transmitting a HARQ subpacket when performing UL (uplink) CliCo according to a first embodiment of the present invention, individual HARQ subpackets transmitted by originating MS 104 in FIG. 5 and cooperating MS 106 in FIG. 6 are created so as to be in mutually opposite directions in a circular buffer as shown in FIG. 9.

Examples of the method for reversing the reading direction of the circular buffer include "changing an equation of determining a HARQ subpacket starting position" or "changing a HARQ subpacket transmission rule and an equation of determining a HARQ subpacket starting position."

In the method for only "changing an equation of determining a HARQ subpacket starting position," originating MS 104 and cooperating MS 106 use the same HARQ subpacket transmission rule (e.g., the rule as shown in Table 1), but they use different equations to determine a HARQ subpacket starting position.

For example, based on the HARQ subpacket transmission rule shown in Table 1, a SPIT is reported by resource allocation creation section 134 and is inputted to subpacket generation control section 312. Based on the information of subpacket generation control section 312, HARQ subpacket generator 306 of originating MS 104 can determine the starting position of a HARQ subpacket transmitted at i-th transmission as follows.

[3]

$$P_i = [\text{SPID}(i) \cdot N_{OM}] \mod N_{CB} \qquad \text{(Equation 3)}$$

Here, $N_{OM}$ is a size of a HARQ subpacket in originating MS 104. $N_{CB}$ is a size of a data packet circular buffer defined in equation 1. SPID(i) is an SPID of a HARQ subpacket transmitted at i-th transmission in originating MS 104.

HARQ subpacket generator 306 of cooperating MS 106 can determine the starting position of a HARQ subpacket transmitted at i-th transmission as follows.

[4]

$$P_i = [N_{CB} - (\text{SPID}(i) + 1) \cdot N_{CM}] \mod N_{CB} \qquad \text{(Equation 4)}$$

Here, $N_{CM}$ is a size of a HARQ subpacket in cooperating MS 106. $N_{CB}$ is a size of a data packet circular buffer defined in equation 1. SPID(i) is an SPID of a HARQ subpacket transmitted at i-th transmission in cooperating MS 106.

According to the method for "changing a HARQ subpacket transmission rule and an equation of determining a HARQ subpacket starting position," originating MS 104 and cooperating MS 106 use different HARQ subpacket transmission rules and use different rules for determining a HARQ subpacket starting position. Table 2 shows a typical subpacket transmission rule in originating MS 104 and cooperating MS 106.

TABLE 2

|  | SPID | | | | | |
| --- | --- | --- | --- | --- | --- | --- |
|  | Initial trans- mission | Second trans- mission | Third trans- mission | Fourth trans- mission | Fifth trans- mission | ... |
| Originating MS | 0 | 1 | 2 | 3 | 0 | ... |
| Cooperating MS | 3 | 2 | 1 | 0 | 3 | ... |

Based on the subpacket transmission rule shown in Table 2, a SPID is reported by resource allocation creation section 134 and is inputted to subpacket generation control section 312.

In originating MS 104, the starting position of a HARQ subpacket transmitted at i-th transmission can be determined by equation 3. In cooperating MS 106, the starting position of a HARQ subpacket transmitted at i-th transmission can be determined as follows.

[5]

$$P_i = [N_{CB} - (4 - \text{SPID}(i)) \cdot N_{CM}] \mod N_{CB} \qquad \text{(Equation 5)}$$

Here, $N_{CM}$ is a size of a HARQ subpacket in cooperating MS 106. $N_{CB}$ is a size of a data packet circular buffer defined in equation 1. SPID(i) is an SPID of a HARQ subpacket transmitted at i-th transmission in cooperating MS 106.

It should be noted that the subpacket transmission rule shown in Table 1 and the rules for determining a HARQ subpacket starting position defined in equation 3 and equation 4 are substantially equivalent to the subpacket transmission rule shown in Table 2 and the rules for determining a HARQ subpacket starting position defined in equation 3 and equation 5.

FIG. 9 shows transmission of a typical HARQ subpacket for both originating MS 104 and cooperating MS 106 according to the subpacket transmission rule shown in Table 1 and the rules for determining a HARQ subpacket starting position defined in equation 3 and equation 4. In FIG. 9, suppose $M_{cr} = 1/3$, $N_{OM} = 3/8 \cdot N_{CB}$ and $N_{CM} = 1/4 \cdot N_{CB}$.

in originating MS 104, the starting positions of HARQ subpackets in four transmissions including the initial transmission are calculated as follows.

$$P_1 = 0$$

$$P_2 = 3/8 \cdot N_{CB}$$

$$P_3 = 3/4 \cdot N_{CB} (= 6/8 \cdot N_{CB})$$

$$P_4 = 1/8 \cdot N_{CB}$$

In cooperating MS 106, the starting positions of HARQ subpackets in four transmissions including the initial transmission are calculated as follows.

$$P_1 = 3/4 \cdot N_{CB}$$

$$P_2 = 1/2 \cdot N_{CB} (= 2/4 \cdot N_{CB})$$

$$P_3 = 1/4 \cdot N_{CB}$$

$$P_4 = 0$$

It is easily understandable from FIG. 9 that individual HARQ subpackets transmitted by originating MS 104 and cooperating MS 106 are created so as to be in mutually opposite directions in the circular buffer. Furthermore, since there is no overlapping between the first HARQ subpackets transmitted by originating MS 104 and cooperating MS 106, a signal combining gain of HARQ IR at initial transmission is maximized.

According to the first embodiment of the present invention, the starting position in the circular buffer of the first HARQ subpacket transmitted by originating MS 104 is set at a leading end of the circular buffer and the termination position in the circular buffer of the first HARQ subpacket transmitted by cooperating MS 106 is set at a rear end of the circular buffer. The starting position in the circular buffer of the first HARQ subpacket transmitted by originating MS 104 and the termination position in the circular buffer of the first HARQ subpacket transmitted by cooperating MS 106 may be set to the opposite of the positions described above.

According to the first embodiment of the present invention, overlapping between the individual HARQ subpackets transmitted by originating MS 104 and cooperating MS 106 is minimized and the signal combining gain of HARQ IR is thereby maximized at initial transmission in particular.

Second Embodiment

According to the first embodiment of the present invention shown in FIG. 9, the first subpacket transmitted by originating MS 104 needs to include all information bits, that is, $N_{OM} \geq M_{cr} \cdot N_{CB}$. This constraint reduces flexibility of resource allocation by BS 102.

In a method for transmitting a HARQ subpacket when performing UL (uplink) CliCo according to a second embodiment of the present invention, both originating MS 104 and cooperating MS 106 transmit some of information bits at initial transmission. To be more specific, the starting position of a first HARQ subpacket transmitted by originating MS 104 is set at a certain position within a range of information bits in a circular buffer, and the termination position of the first HARQ subpacket transmitted by cooperating MS 106 is also set at a certain position within a range of information bits in the circular buffer.

As in the case of the first embodiment of the present invention, according to the second embodiment of the present invention, individual HARQ subpackets transmitted by originating MS 104 and cooperating MS 106 are created so as to be in mutually opposite directions in the circular buffer.

According to the second embodiment of the present invention, there are various methods for designing rules for determining starting positions of HARQ subpackets.

For example, while satisfying the HARQ subpacket transmission rule shown in Table 1, the starting position of a HARQ subpacket transmitted at i-th transmission in originating MS 104 can be determined as follows.

[6]

$$P_i = [M_{cr} \cdot N_{CB} + (\text{SPID}(i) - \alpha) \cdot N_{OM}] \bmod N_{CB} \quad \text{(Equation 6)}$$

Here, $M_{cr}$ is a mother coding rate of FEC encoder 304. $N_{OM}$ is a size of a HARQ subpacket in originating MS 104. $\alpha \cdot N_{OM}$ shows an offset (difference) of the starting position of a first subpacket of originating MS 104, relative to the position of the last information bit in the circular buffer. The value of $\alpha$ ($0 < \alpha < 1$) may be either predetermined or settable. $N_{CB}$ is a size of a data packet circular buffer defined in equation 1. SPID(i) is an SPID of a HARQ subpacket transmitted at i-th transmission in originating MS 104.

In cooperating MS 106, the starting position of a HARQ subpacket transmitted at i-th transmission is determined as follows.

[7]

$$P_i = [N_{CB} - \text{SPID}(i) \cdot N_{CM}] \bmod N_{CB} \quad \text{(Equation 7)}$$

Here, $N_{CM}$ is a size of a HARQ subpacket in cooperating MS 106. $N_{CB}$ is a size of the data packet circular buffer defined in equation 1. SPID(i) is an SPID of a HARQ subpacket transmitted at i-th transmission in cooperating MS 106.

According to the HARQ subpacket transmission rule shown in Table 1 and the rules for determining the starting positions of HARQ subpackets defined in equation 6 and equation 7, a constraint on resource allocation is $\alpha \cdot N_{OM} + N_{CM} \geq M_{cr} \cdot N_{CB}$. Since the constraint is relaxed compared to the first embodiment of the present invention, flexibility of resource allocation by BS 102 is increased.

In order to minimize overlapping between the first HARQ subpackets transmitted by originating MS 104 and cooperating MS 106 according to the HARQ subpacket transmission rule shown in Table 1 and the rules for determining the starting positions of HARQ subpackets defined in equation 6 and equation, an optimal value of $\alpha$ is assumed to be determined as follows.

(Equation 8)

$$\alpha = \frac{M_{cr} \cdot N_{CB} - N_{CM}}{N_{OM}} \quad [8]$$

That is, parameter $\alpha$ is assumed to be settable depending on $M_{cr}$, $N_{CB}$, $N_{OM}$ and $N_{CM}$. In this case, the value of $\alpha$ can be indicated among MAP IEs that carry resource allocation information for initial transmission. This produces additional signalling overhead compared to predetermined $\alpha$.

Figure 10:
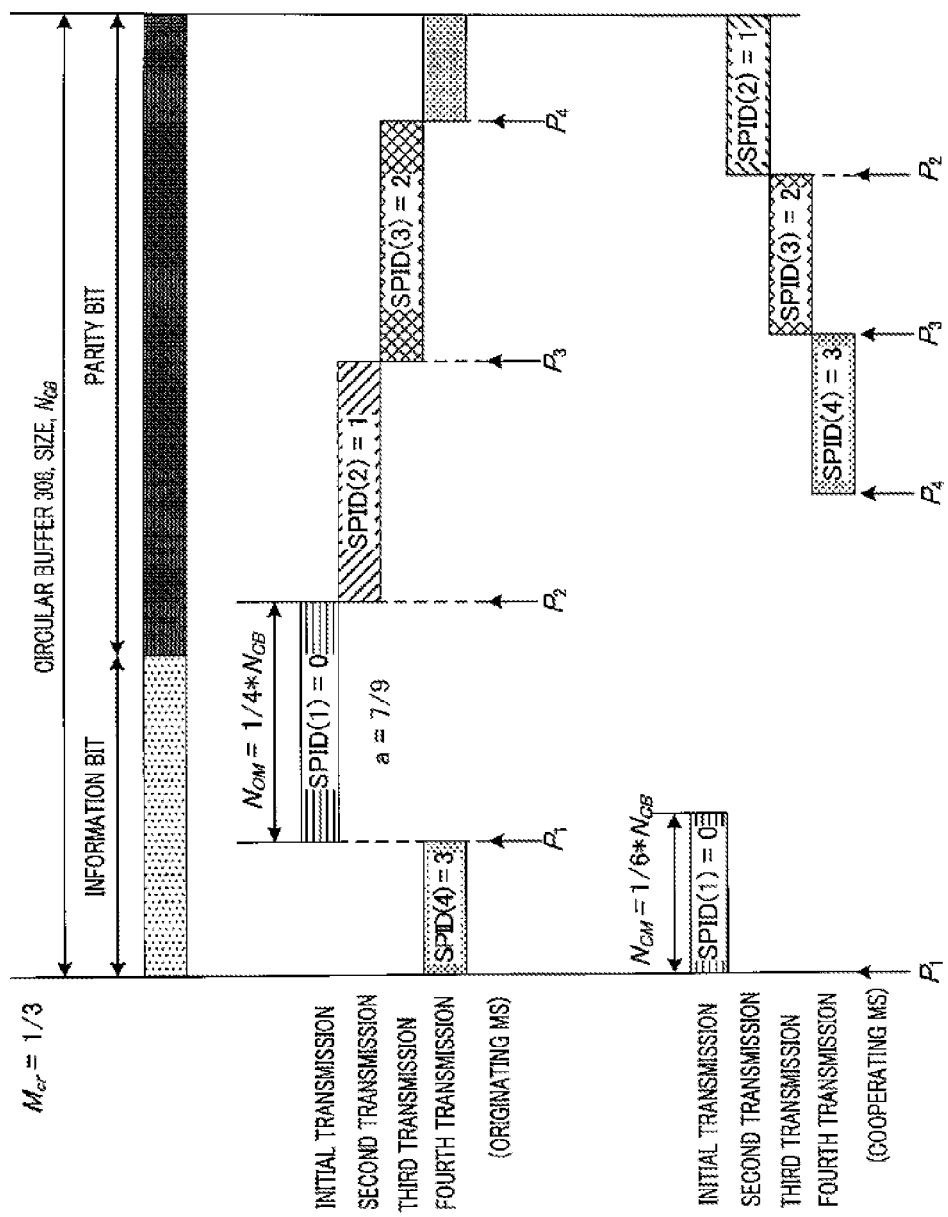
FIG. 10 is a diagram illustrating transmission of a typical HARQ subpacket transmitted four times including the initial transmission with parameter α set as a first value according to a second embodiment of the present invention.
Figure 11:
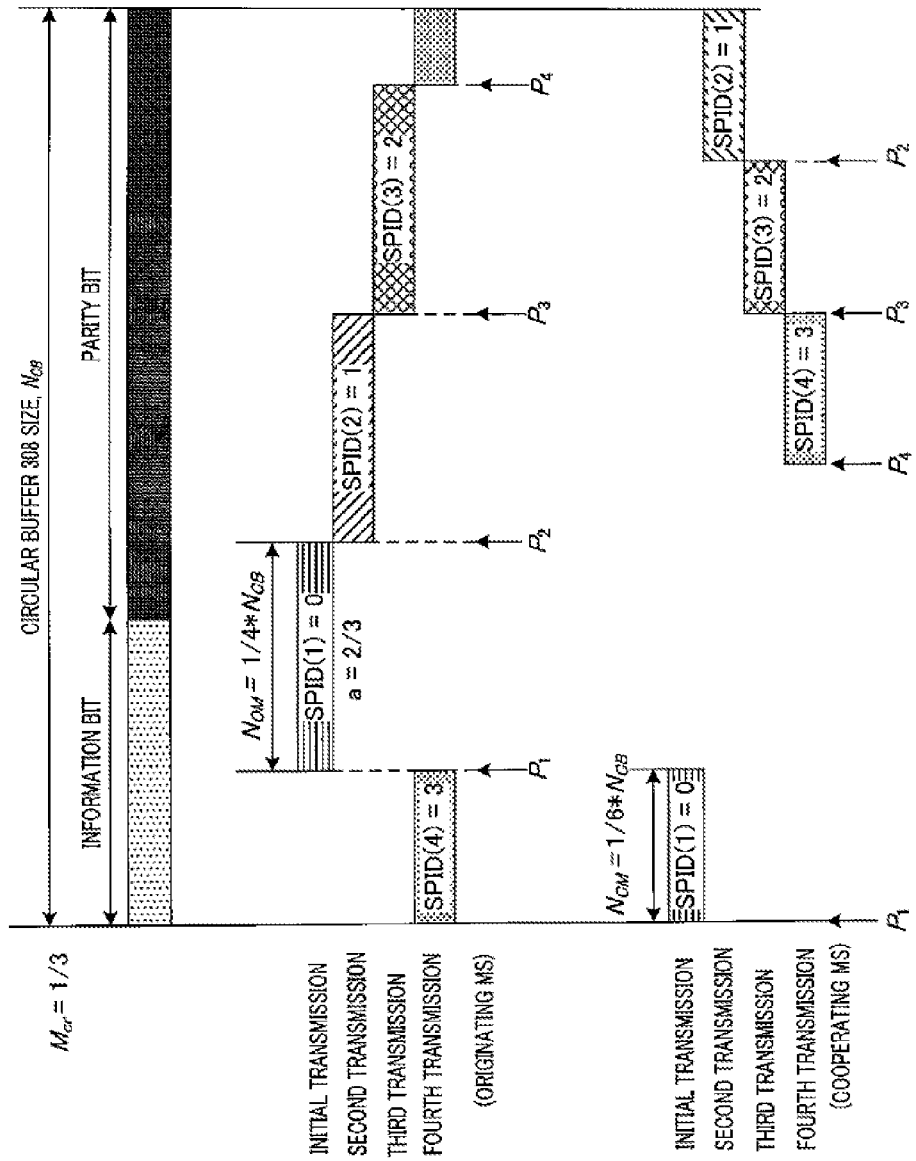
FIG. 11 is a diagram illustrating transmission of a typical HARQ subpacket transmitted four times including the initial transmission with parameter α set as a second value according to the second embodiment of the present invention.

FIG. 10 and FIG. 11 illustrate typical HARQ subpacket transmission by both originating MS 104 and cooperating MS 106 when two different values of $\alpha$ are set according to the subpacket transmission rule shown in Table 1 and the rules for determining the starting positions of HARQ subpackets defined in equation 6 and equation 7. In FIG. 10 and FIG. 11, suppose $M_{cr} = 1/3$, $N_{OM} = 1/4 \cdot N_{CB}$ and $N_{CM} = 1/6 \cdot N_{CB}$.

Referring to FIG. 10 when $\alpha = 7/6$ is set, the starting positions of HARQ subpackets in four transmissions including the initial transmission in originating MS 104 are calculated as follows.

$$P_1 = 5/36 \cdot N_{CB}$$

$$P_2 = 7/18 \cdot N_{CB} (= 14/36 \cdot N_{CB})$$

$$P_3 = 23/36 \cdot N_{CB}$$

$$P_4 = 8/9 \cdot N_{CB} (= 32/36 \cdot N_{CB})$$

Referring to FIG. 11 when $\alpha = 2/3$ is set, the starting positions of HARQ subpackets in four transmissions including the initial transmission in originating MS 104 are calculated as follows.

$$P_1 = 1/6 \cdot N_{CB} (= 2/12 \cdot N_{CB})$$

$$P_2 = 5/12 \cdot N_{CB}$$

$$P_3 = 2/3 \cdot N_{CB} (= 8/12 \cdot N_{CB})$$

$$P_4 = 11/12 \cdot N_{CB}$$

Referring to FIG. 10 and FIG. 11, the starting positions of HARQ subpackets in four transmissions including the initial transmission in cooperating MS 106 are calculated as follows.

$P_1=0$ $P_2=\frac{5}{6} \cdot N_{CB}$ $P_3=\frac{2}{3} \cdot N_{CB} (=\frac{4}{6} \cdot N_{CB})$ $P_4=\frac{1}{2} \cdot N_{CB} (=\frac{3}{6} \cdot N_{CB})$ It is easily understandable from FIG. 10 and FIG. 11 that the first HARQ subpacket transmitted by originating MS 104 starts within a range of information bits in the circular buffer and the first. HARQ subpacket transmitted by cooperating MS 106 terminates within a range of information bits in the circular buffer. Furthermore in the case of $\alpha=\frac{7}{8}$, there is still slight overlapping between the first HARQ subpackets transmitted by originating MS 104 and cooperating MS 106. However, in the case of $\alpha=\frac{2}{3}$, there is no more overlapping between the first HARQ subpackets transmitted by originating MS 104 and cooperating MS 106. It is also understandable that the four HARQ subpackets transmitted by originating MS 104 are created so as to be in different directions in the circular buffer from the four HARQ subpackets transmitted by cooperating MS 106.

It should be noted that according to the rules for determining the starting positions of HARQ subpackets defined in equation 6 and equation 7, the starting positions of HARQ subpackets transmitted by originating MS 104 depend on parameter $\alpha$. As an alternative technique, it is also possible to design rules for determining the starting positions of HARQ subpackets so that the starting positions of HARQ subpackets transmitted by cooperating MS 106 depend on parameter $\alpha$.

For example, the starting position of a HARQ subpacket transmitted at i-th transmission in originating MS 104 can be determined as follows.

[9]

$$P_i=[M_{cr} \cdot N_{CB}+(SPID(i)-1) \cdot N_{OM}] \bmod N_{CB} \quad \text{(Equation 9)}$$

Here, $M_{cr}$ is a mother coding rate of FEC encoder 304. $N_{OM}$ is a size of a HARQ subpacket in originating MS 104. $N_{CB}$ is a size of the data packet circular buffer defined in equation 1. SPID(i) is an SPID of a HARQ subpacket transmitted at i-th transmission in originating MS 104.

Cooperating MS 106 can determine the starting position of the HARQ subpacket transmitted at i-th transmission as follows.

[10]

$$P_i=[N_{CB}-(SPID(i)+1-\alpha) \cdot N_{CM}] \bmod N_{CB} \quad \text{(Equation 10)}$$

Here, $N_{CM}$ is a size of a HARQ subpacket in cooperating MS 106. $N_{CB}$ is a size of the data packet circular buffer defined in equation 1. $\alpha \cdot N_{CM}$ indicates an offset (difference) of the termination position of the first subpacket of cooperating MS 106, relative to the leading end of the circular buffer. The value of $\alpha$ ($0<\alpha<1$) is either predetermined or settable. SPID(i) is an SPUD of the HARQ subpacket transmitted at i-th transmission in cooperating MS 106.

According to the HARQ subpacket transmission rule shown in Table 1 and the rules for determining the starting positions of HARQ subpackets defined in equation 9 and equation 10, the constraint on resource allocation is $N_{OM}+\alpha \cdot N_{CM} \geq M_{cr} \cdot N_{CB}$. Thus, the constraint is also relaxed compared to the first embodiment of the present invention.

According to the HARQ subpacket transmission rule shown in Table 1 and the rules for determining the starting positions of HARQ subpackets defined in equation 9 and equation 10, an optimal value of $\alpha$ is assumed to be determined to minimize overlapping between the first HARQ subpackets transmitted by originating MS 104 and cooperating MS 106 as follows.

(Equation 11)

$$\alpha = \frac{M_{cr} \cdot N_{CB} - N_{OM}}{N_{CM}} \quad [11]$$

Third Embodiment

According to the second embodiment of the present invention, a settable $\alpha$ can be used to minimize overlapping between the first subpackets transmitted by originating MS 104 and cooperating MS 106. However, the settable $\alpha$ produces additional signalling overhead.

In the method for transmitting HARQ subpackets when performing UL (uplink) CliCo according to the third embodiment of the present invention, the starting positions of individual HARQ subpackets of originating MS 104 are determined according to the sizes of HARQ subpackets of cooperating MS 106 and the starting positions of individual HARQ subpackets of cooperating MS 106 are determined according to the sizes of HARQ subpackets of originating MS 104.

According to the third embodiment of the present invention, the starting position of an i-th HARQ subpacket transmitted by cooperating MS 106 is set at a termination position of the i-th HARQ subpacket transmitted by originating MS 104 and the starting position of the (i+1)-th HARQ subpacket transmitted by originating MS 104 is set at a termination position of the i-th HARQ subpacket transmitted by cooperating MS 106.

According to the third embodiment of the present invention, as in the case of the conventional technique, individual HARQ subpackets transmitted by originating MS 104 and cooperating MS 106 are created so as to be in the same direction in the circular buffer.

According to the third embodiment of the present invention, overlapping between individual HARQ subpackets transmitted by originating MS 104 and cooperating MS 106 is minimized, and therefore the signal combining gain of HARQ IR is maximized.

According to the third embodiment of the present invention, there are various methods for designing rules for determining the starting positions of HARQ subpackets.

For example, while satisfying the subpacket transmission rule shown in Table 1, the starting positions of a HARQ subpacket transmitted at i-th transmission in originating MS 104 can be determined as follows.

[12]

$$P_i=[SPID(i) \cdot (N_{OM}+N_{CM})] \bmod N_{CB} \quad \text{(Equation 12)}$$

Here, $N_{OM}$ is a size of a HARQ subpacket in originating MS 104. $N_{CM}$ is a size of a HARQ subpacket in cooperating MS 106. $N_{CB}$ is a size of the data packet circular buffer defined in equation 1. SPID(i) is an SPID of a subpacket transmitted at i-th transmission in originating MS 104.

In cooperating MS 106, the starting position of a HARQ subpacket transmitted at i-th transmission is determined as follows.

[13]

$$P_i=[N_{OM}+SPID(i) \cdot (N_{OM}+N_{CM})] \bmod N_{CB} \quad \text{(Equation 13)}$$

Here, $N_{OM}$ is a size of a HARQ subpacket in originating MS 104. $N_{CM}$ is a size of a HARQ subpacket in cooperating MS 106. $N_{CB}$ is a size of the data packet circular buffer defined in equation 1. SPID(i) is an SPID of a subpacket transmitted at i-th transmission in cooperating MS 106.

According to the rules for determining the starting positions of HARQ subpackets defined in equation 12 and equation 13, the requirement is that originating MS 104 should know the sizes of HARQ subpackets of cooperating MS 106 beforehand and that cooperating MS 106 should know the sizes of HARQ subpackets of originating MS 104.

According to the HARQ subpacket transmission rule shown in Table 1 and the rules for determining the starting positions of HARQ subpackets defined in equation 12 and equation 13, the constraint on resource allocation is $N_{OM} + N_{CM} \geq M_{cr} \cdot N_{CB}$. In this way, the constraint is also relaxed compared to the first embodiment of the present invention.

Figure 12:
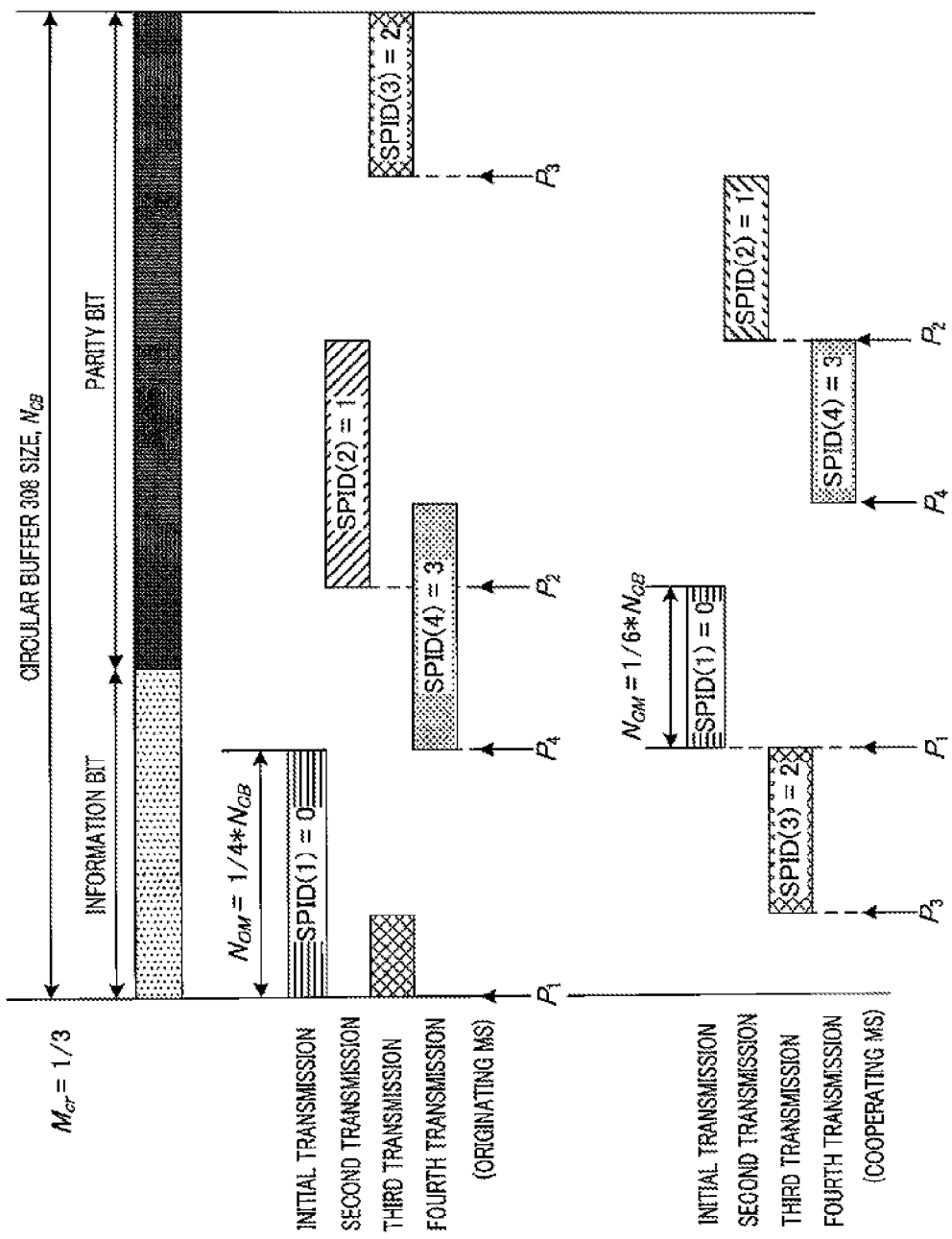
FIG. 12 is a diagram illustrating transmission of a typical HARQ subpacket transmitted four times including the initial transmission according to a third embodiment of the present invention.

FIG. 12 illustrates typical HARQ subpacket transmission in both originating MS 104 and cooperating MS 106 according to the subpacket transmission rule shown in Table 1 and the rules for determining the starting positions of HARQ subpackets defined in equation 12 and equation 13. In FIG. 12, suppose $M_{cr}=1/3$, $N_{OM}=1/4 \cdot N_{CB}$, and $N_{CM}=1/6 \cdot N_{CB}$.

Referring to FIG. 12, the starting positions of HARQ subpackets in four transmissions including the initial transmission in originating MS 104 are calculated as follows.

$$P_1 = 0$$

$$P_2 = 5/12 \cdot N_{CB}$$

$$P_3 = 5/6 \cdot N_{CB} (= 10/12 \cdot N_{CB})$$

$$P_4 = 1/4 \cdot N_{CB} (= 3/12 \cdot N_{CB})$$

The starting positions of HARQ subpackets in four transmissions including the initial transmission in originating MS 106 are calculated as follows, $$P_1 = 1/4 \cdot N_{CB} (= 3/12 \cdot N_{CB})$$

$$P_2 = 2/3 \cdot N_{CB} (= 8/12 \cdot N_{CB})$$

$$P_3 = 1/12 \cdot N_{CB}$$

$$P_4 = 1/2 \cdot N_{CB} (= 6/12 \cdot N_{CB})$$

It is easily understandable from FIG. 12 that there is no overlapping between individual HARQ subpackets of originating MS 104 and cooperating MS 106 at first two transmissions, and therefore the signal combining gain of HARQ IR at the first two transmissions is maximized.

The disclosure of Japanese Patent Application No. 2010-206768, filed on Sep. 15, 2010, including the specification, drawings and abstract is incorporated herein by reference in its entirety.

INDUSTRIAL APPLICABILITY

The present invention is useful for a radio communication apparatus or the like.

REFERENCE SIGNS LIST

100 Radio communication system
102 BS (base station)
104, 106 MS (mobile station)
108, 110 WiMAX link
112 Wi-Fi link
120, 146 WiMAX MAC
122, 154 Control section
124, 158 Scheduler
126, 152 Message creation section
128, 156 Message processing section
130, 142 WiMAX PHY
132 HFBCH creation section
134 Resource allocation creation section
136, 162, 182 OFDMA transmitter
138, 164 OFDMA receiver
144 Wi-Fi PHY
148 Wi-Fi MAC
150 GLL
151 Resource analysis section
153 HFBCH analysis section
304 FEC encoder
306 HARQ subpacket generator
308 Circular buffer
310 Modulator
312 Subpacket generation control section
502, 402, 602 Channel coder
504, 404 Channel decoder

The invention claimed is:

1. A radio communication apparatus that performs hybrid automatic repeat request (HARQ) transmission, comprising:
a HARQ subpacket generator that generates a first HARQ subpacket for transmitting by the radio communication apparatus in a direction opposite to the direction of a second HARQ subpacket transmitted by an originating mobile station (MS) in a circular buffer; and
a transmitter that transmits the first generated HARQ subpacket, wherein the HARQ transmission is performed in collaboration between the radio communication apparatus and the originating MS,
wherein a starting position of an (i+1)-th HARQ subpacket of the originating MS is set at a termination position of an i-th HARQ subpacket of the radio communication apparatus and a starting position of an i-th HARQ subpacket of the radio communication apparatus is set at a termination position of an i-th HARQ subpacket of the originating MS,
wherein the HARQ subpacket generator sets a starting position in the circular buffer of the second HARQ subpacket transmitted by the originating MS at a certain position within a range of information bits in the circular buffer and a termination position in the circular buffer of the first HARQ subpacket transmitted by the radio communication apparatus at the certain position within the range of information bits in the circular buffer,
wherein the certain position within the range of information bits in the circular buffer is set by an offset of the starting position in the circular buffer of the second HARQ subpacket transmitted by the originating MS, relative to the position of the last information bit in the circular buffer, and a parameter $\alpha$ corresponding to the offset is settable according to a coding rate of an encoder, a circular buffer size, a size of the second HARQ subpacket transmitted by the originating MS or a size of the first HARQ subpacket transmitted by the radio communication apparatus.

2. The radio communication apparatus according to claim 1, wherein the HARQ subpacket generator sets a starting position in the circular buffer of the second HARQ subpacket transmitted by the originating MS at a leading end of the circular buffer and a termination position in the circular buffer of the first HARQ subpacket transmitted by the radio communication apparatus at a rear end of the circular buffer.

3. The radio communication apparatus according to claim 1, wherein:
the certain position within the range of information bits in the circular buffer is set by an offset of the termination position in the circular buffer of the first HARQ subpacket transmitted by the radio communication apparatus, relative to a leading end of the circular buffer.

4. A HARQ transmission method for a radio communication apparatus that performs hybrid automatic repeat request (HARQ) transmission, the method comprising:
generating individual HARQ subpackets for transmitting by the radio communication apparatus in a direction opposite to the direction of individual HARQ subpackets transmitted by an originating mobile station (MS) in a circular buffer;
when starting positions of the individual HARQ subpackets transmitted by the originating MS are set according to sizes of the individual HARQ subpackets transmitted by the radio communication apparatus, setting starting positions of the individual HARQ subpackets transmitted by the radio communication apparatus according to the sizes of the individual HARQ subpackets transmitted by the originating MS, and
transmitting the generated individual HARQ subpackets by the radio communication apparatus, wherein the HARQ transmission is performed in collaboration between the radio communication apparatus and the originating MS,
a starting position of an (i+1)-th HARQ subpacket of the originating MS is set at a termination position of an i-th HARQ subpacket of the radio communication apparatus and a starting position of an i-th HARQ subpacket of the radio communication apparatus is set at a termination position of an i-th HARQ subpacket of the originating MS,
a starting position in the circular buffer of the second HARQ subpacket transmitted by the originating MS is set at a certain position within a range of information bits in the circular buffer and a termination position in the circular buffer of the first HARQ subpacket transmitted by the radio communication apparatus is set at the certain position within the range of information bits in the circular buffer,
the certain position within the range of information bits in the circular buffer is set by an offset of the starting position in the circular buffer of the second HARQ subpacket transmitted by the originating MS, relative to the position of the last information bit in the circular buffer, and
a parameter $\alpha$ corresponding to the offset is settable according to a coding rate of an encoder, a circular buffer size, a size of the second HARQ subpacket transmitted by the originating MS or a size of the first HARQ subpacket transmitted by the radio communication apparatus.

* * * * *